US005630065A

United States Patent [19]
Ishii

[11] Patent Number: 5,630,065
[45] Date of Patent: May 13, 1997

[54] TIME DIVISION MULTIPLEXING COMMUNICATION SYSTEM FOR TRANSMITTING DATA FROM PLURALITY OF TRANSMITTING LINKS TO PLURALITY OF RECEIVING LINKS USING LINK HIGHWAY, CONCENTRATOR, AND DISTRIBUTOR

[75] Inventor: Nobuaki Ishii, Tokyo, Japan

[73] Assignee: NEC Corporation, Tokyo, Japan

[21] Appl. No.: 559,047

[22] Filed: Nov. 15, 1995

[30] Foreign Application Priority Data

Nov. 17, 1994 [JP] Japan ................... 6-283400

[51] Int. Cl.[6] ............................................. G06F 13/00
[52] U.S. Cl. ............................... 395/200.06; 370/358
[58] Field of Search ........................... 370/29, 46, 53, 370/56, 58.1, 58.2, 58.3, 60, 63, 68, 77, 78, 91, 92, 93, 94.1, 95.3, 112; 395/200.06

[56] References Cited

U.S. PATENT DOCUMENTS

| | | | |
|---|---|---|---|
| 3,639,693 | 2/1972 | Bartlett et al. | 370/63 |
| 4,042,785 | 8/1977 | Rigo et al. | 379/26 |
| 4,186,276 | 1/1980 | Schlichte | 370/63 |
| 4,327,436 | 4/1982 | Ohara et al. | 370/110.1 |
| 5,164,937 | 11/1992 | Tanabe et al. | 370/56 |
| 5,206,933 | 4/1993 | Farrell et al. | 395/200.2 |
| 5,430,722 | 7/1995 | Jacob et al. | 370/60.1 |
| 5,434,859 | 7/1995 | Levardon | 370/84 |

FOREIGN PATENT DOCUMENTS 4-220848  8/1992  Japan .

OTHER PUBLICATIONS

"A Fast Decoupled Approach for Optimum TDM Assignment in Constrained Hierarchical Switching Systems", by A Campora et al, IEEE 1988, pp. 636–640.

"Design of Transmission and Multiplexing Systems for Broadband Packet Networks", by Jonathan Chao, IEEE 1988, pp. 1511–1520.

*Primary Examiner*—Thomas C. Lee
*Assistant Examiner*—Moustafa Mohamed Meky
*Attorney, Agent, or Firm*—Foley & Lardner

[57] ABSTRACT

A time-division multiplex communication system includes a link highway having a common data link channel and an address identification channel, a concentrator, and a distributor. The concentrator monitors signals from individual links connected to respective individual link terminators, connects one of the individual links from which an input signal is received to a common data link channel, and transmits address information of the individual link through an address identification channel. The concentrator processes input signals from the respective individual links and sends them to the common data link channel in a manner to multiplex them at variable data rates as viewed from the individual links. The distributor receives signals from the common data link channel, and successively transmits the signals to respective individual links according to address information from the address identification channel for thereby transmitting data represented by the signals.

4 Claims, 5 Drawing Sheets

TIME DIVISION MULTIPLEXING COMMUNICATION SYSTEM FOR TRANSMITTING DATA FROM PLURALITY OF TRANSMITTING LINKS TO PLURALITY OF RECEIVING LINKS USING LINK HIGHWAY, CONCENTRATOR, AND DISTRIBUTOR

BACKGROUND OF THE INVENTION

1. Field of the Invention

The present invention relates to a time-division multiplex communication system having a transmission path which links or connects a plurality of independent signal data links.

2. Description of the Prior Art

Heretofore, time-division multiplex communication systems generally have a time-divided highway composed of time slots each fixedly assigned to a certain channel or link. Even if the time slots are of a multiframe structure, each of the channels is independent per frame, and has a constant transmission period or transmission rate.

Japanese Patent Laid Open No. 220848/92 discloses a time-division multiplex communication system in which a plurality of time slots are variably combined into various bandwidths for providing extended channels of variable rates. Since there is a limitation on the number of time slots in one frame, if more time slots are to be introduced for providing an extended channel, then it has heretofore been necessary to move or delete another channel in which such time slots have been used, or to reserve a maximum number of time slots corresponding to a required bandwidth for the extended channel.

For multilink operation sharing the time slots over a link transmission path, it has been necessary to terminate the individual links at the inlet and outlet ends of the link transmission path and multiplex the link transmission path using a multilink protocol.

In the conventional time-division multiplex communication systems described above, the transmission rate of a time slot assigned to each channel is constant at all times irrespective of the amount of signals flowing through the time slot. Therefore, if the conventional time-division multiplex communication systems incorporate independent links for which the average amount of signals is relatively small and the loads vary, then since each of the channels is required to be associated with a transmission path necessary to carry the largest traffic load, the efficiency of the system is usually low.

In the case where a plurality of time slots are variably combined depending on the load to provide extended channels of variable rates, because the number of time slots in one frame is predetermined, if more time slots are to be introduced for providing an extended channel, then other channels may be affected as another channel in which such time slots have been used has to be moved or deleted. If a maximum number of time slots corresponding to a required bandwidth are assigned beforehand to an extended channel in order that other channels may not be affected, then the assigned time slots are not effectively used in usual times at which the load is small, resulting in idle slot times which lower the efficiency of the time-divided highway.

If a multilink arrangement which shares certain time slots is employed according to a multilink protocol in order to absorb load variations of the links, then since the individual links have to be terminated at the inlet and outlet ends of the link transmission path, the penetrability of the multilink protocol between the terminated ends of the links cannot be assured.

SUMMARY OF THE INVENTION

It is therefore an object of the present invention to provide a time-division multiplex communication system which has a multilink arrangement to achieve variable data rates in physical layers of a link transmission path without affecting the individual links, for thereby increasing the efficiency with which the link transmission path operates.

According to the present invention, there is provided a time-division multiplex communication system for transmitting data from a plurality of transmitting individual links connected to respective individual link terminators to a plurality of receiving individual links connected to respective individual link terminators, comprising a link highway having a common data link channel and an address identification channel, a concentrator comprising a plurality of input ports for receiving and temporarily holding input signals transmitted from the transmitting individual links through the respective individual link terminators, address detecting means for detecting reception of the input signals by the input ports and detecting input port addresses of the input signals from physical positions of the input ports, input port switching means for connecting an indicated input port to the common data link channel for an indicated period of time, concentration control means for controlling the input port switching means to connect one of the input ports which is indicated by the input port address of an input signal to the common data link channel of the link highway for a period of time depending on the length of the input signal, and address information transmitting means for transmitting the input port address to the address identification channel of the link highway, and a distributor comprising, a common data link channel input port for receiving a signal from the common data link channel, an address channel input port for receiving address information from the address identification channel, individual link connecting means for connecting the common data link channel input port to an indicated one of the receiving individual links for an indicated period of time, and distribution control means for controlling selection of one of the receiving individual links to be connected to the common data link channel input port and the last-mentioned indicated period of time based on the address information received by the address channel input port.

Signals transmitted from the individual link terminators are temporarily held by the input ports of the concentrator in a transmitting station. When the concentrator which monitors the input ports detects an input signal received by one of the input ports, it connects the input port switching means to the input port which has detected the received input signal to transmit the input signal to the common data link channel, and sends the input port address over the address identification channel. The input signal and the input port address are thus transmitted through the link highway to the distributor.

The input signal and the input port address which have been transmitted through the link highway are received respectively by the common data link channel input port and the address channel input port of the distributor in a receiving station. The distribution control means controls the individual link connecting means to connect the common data link channel input port to a corresponding one of individual links based on the input port address from the address channel input port, thereby transmitting the signal to an individual link terminator which terminates the corresponding individual link.

With the above arrangement, while the individual links connected to the concentrator shares the common data link channel of the link highway, the link layers of the respective individual links are not modified, and the individual links are arranged in a multilink arrangement in physical layers of the link highway. The individual links can utilize the common data link channel flexibly, i.e., at variable rates, depending on the load, without affecting other channels in the link highway, so that the efficiency with which the link highway operates can be increased.

According to another aspect of the present invention, when any of the input ports is receiving no signal, the input port switching means is connected to flag generating means to transmit a flag pattern to the common data link channel. According to still another aspect of the present invention, flag generating means is connected to the individual link connecting means for transmitting a flag pattern to those individual links which are not addressed by the input port address.

The above and other objects, features, and advantages of the present invention will become apparent from the following description with reference to the accompanying drawings which illustrate examples of the present invention.

DETAILED DESCRIPTION OF THE PREFERRED EMBODIMENT

Figure 1:
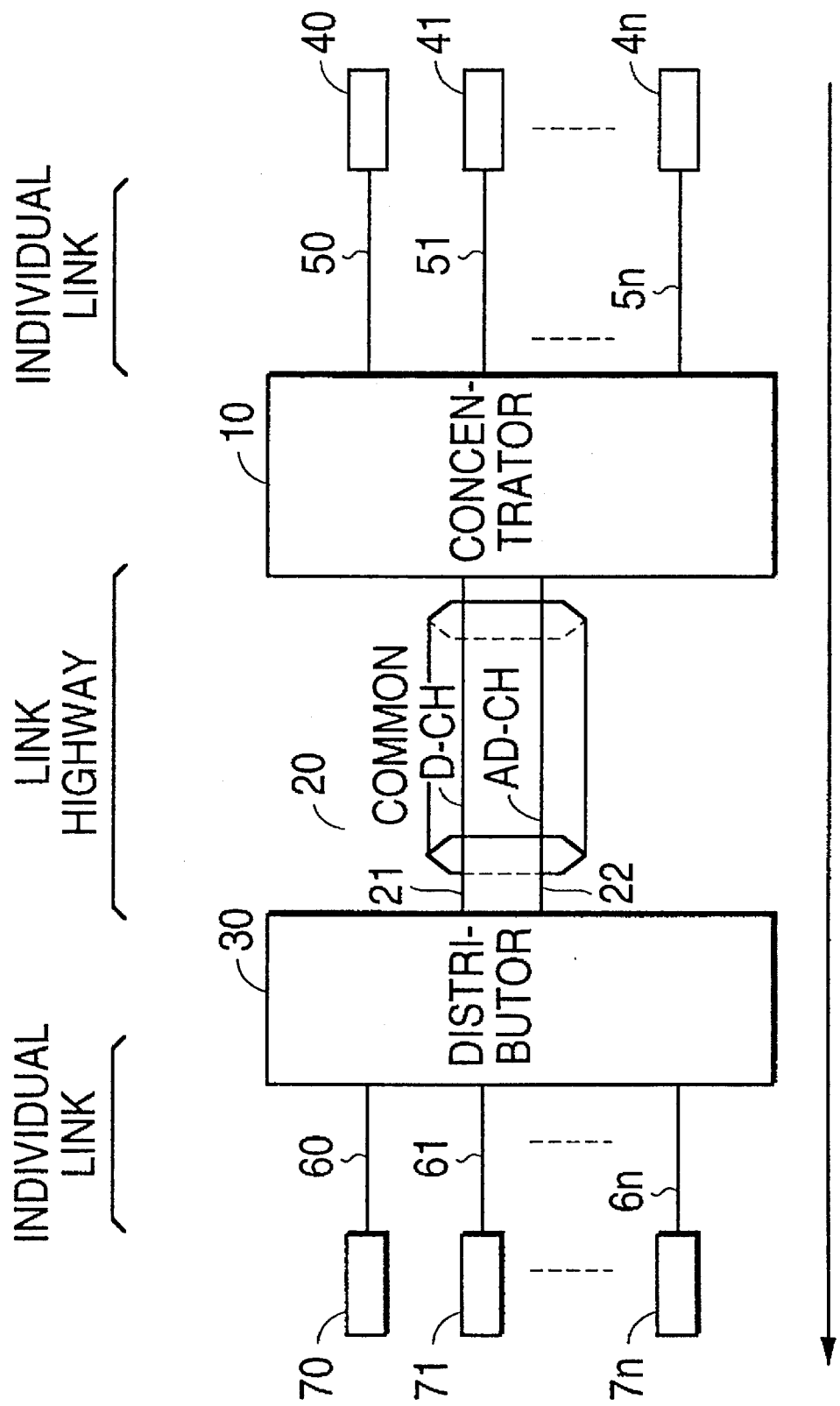
FIG. 1 is a block diagram of a time-division multiplex communication system according to an embodiment of the present invention.

As shown in FIG. 1, a time-division multiplex communication system according to an embodiment of the present invention comprises a plurality of individual link terminators 40, 41, . . . , 4n, a concentrator 10, a link highway 20, a distributor 30, and a plurality of individual link terminators 70, 71, . . . , 7n.

The individual link terminators 40, 41, . . . , 4n, which are located in a transmitting station are connected through respective individual links 50, 51, . . . , 5n to the concentrator 10. The concentrator 10 is connected through the link highway 20, which comprises a common data link channel 21 and an address identification channel 22, to the distributor 30. The distributor 30 is connected through individual links 60, 61, . . . , 6n to the respective individual link terminators 70, 71, . . . , 7n, which are located in a receiving station.

The time-division multiplex communication system shown in FIG. 1 is arranged to transmit data in a direction from the individual link terminators 40, 41, . . . , 4n toward the individual link terminators 70, 71, . . . , 7n. However, time-division multiplex communication systems may be arranged to transmit data in an opposite direction from the individual link terminators 70, 71, . . . , 7n toward the individual link terminators 40, 41, . . . , 4n.

The structures and functions of the various devices of the time-division multiplex communication system shown in FIG. 1 will be described below.

The individual link terminators 40, 41, . . . , 4n and the individual link terminators 70, 71, . . . , 7n have a data link control function. The individual link terminators 40, 41, . . . , 4n are capable of individually communicating with the individual link terminators 70, 71, . . . , 7n, respectively.

The individual links 50, 51, . . . , 5n connect between the individual link terminators 40, 41, . . . , 4n and the concentrator 10, and serve as independent circuits for transmitting control signals between the individual link terminators 40, 41, . . . , 4n.

Similarly, the individual links 60, 61, . . . , 6n connect between the individual link terminators 70, 71, . . . , 7n and the distributor 30, and serve as independent circuits for transmitting control signals between the individual link terminators 70, 71, . . . , 7n.

The concentrator 10 has a concentration control function to interconnect the individual links 50, 51, . . . , 5n and multiplexes signals over the common data link channel 21 of the link highway 20, and an address information generation function to distinguish between links to which input signals are supplied. The link highway 20 is a circuit for time-division-multiplexing a plurality of voice (data) and control signals in a plurality of time slots, and is composed of the common data link channel 21 and the address identification channel 22 which connect between the concentrator 10 and the distributor 30. The common data link channel 21 is a link control signal common circuit for transmitting control signals, supplied from the individual link terminators 40, 41, . . . , 4n to the concentrator 10, to the distributor 30. The address identification channel 22 is a concentration/distribution control signal circuit for transmitting address information generated by the concentrator 10 to the distributor 30.

The distributor 30 has a distribution control function for distributing link control signals, multiplexed over the common data link channel 21, to the individual links 60, 61, . . . , 6n based on the address information from the address identification channel 22.

Figure 2:
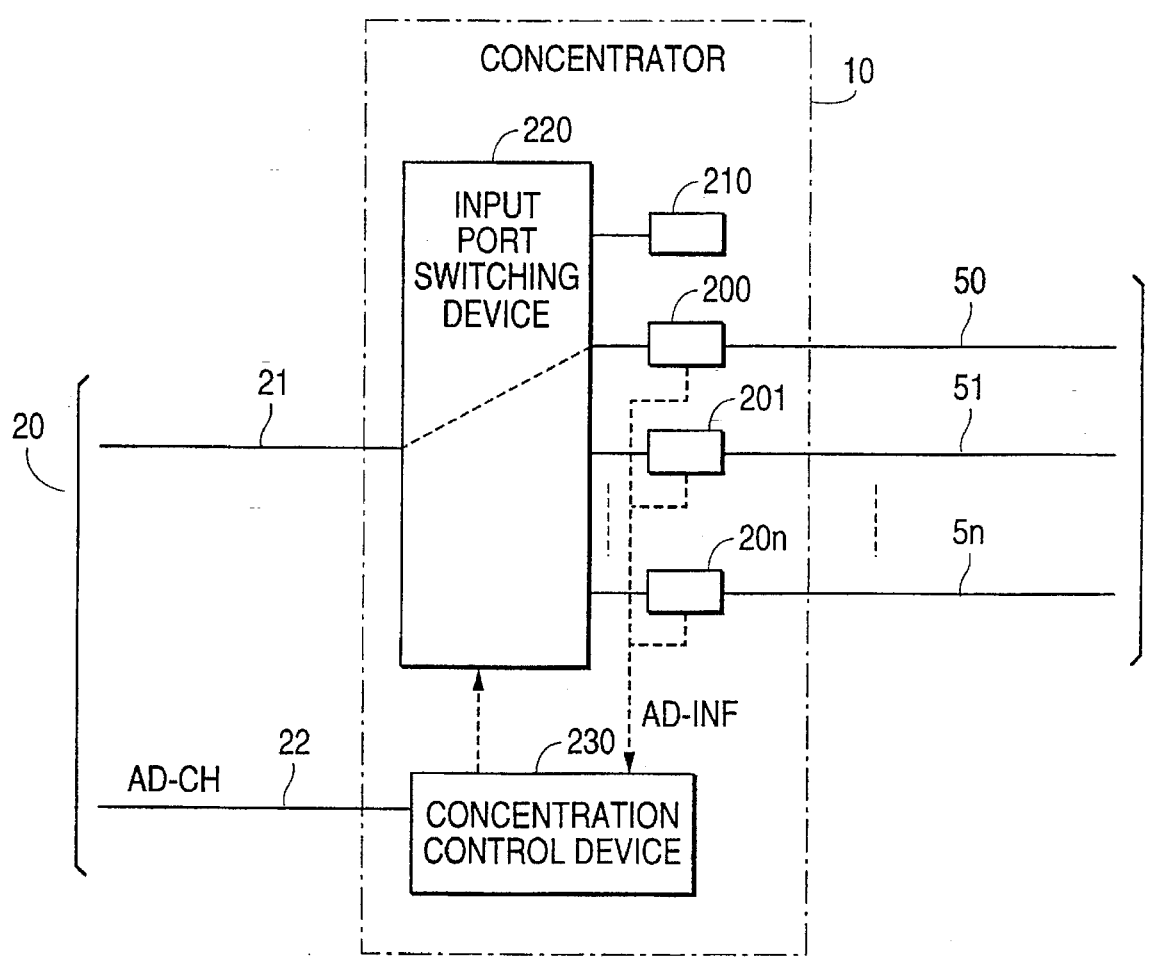
FIG. 2 is a block diagram of a concentrator of the time-division multiplex communication system.

FIG. 2 shows a detailed arrangement of the concentrator 10. Those parts shown in FIG. 2 which are identical to the parts shown in FIG. 1 are denoted by identical reference numerals.

The concentrator 10 comprises a plurality of individual link input ports 200, 201, . . . , 20n, a flag generator 210 as a flag generating means, an input port switching device 220 as an input port switching means, and a concentration control device 230 including an address detecting means, a concentration control means, and an address information transmitting means.

The individual link input ports 200, 201, . . . , 20n connect between the respective individual links 50, 51, . . . , 5n and the input port switching device 220. The flag generator 210 is connected to the input port switching device 220. The input port switching device 220 is connected to the common data link channel 21. The concentration control device 230 is connected to the individual link input ports 200, 201, . . . , 20n, the input port switching device 220, and the address identification channel 22.

The functions of the various devices of the concentrator 10 shown in FIGS. 2 will be described below.

The individual link input ports 200, 201, . . . , 20n have a buffer function to receive and temporarily hold signals transmitted from the respective individual links 50, 51, . . . , 5n, a function to detect the reception of signals, and a function to output signals temporarily stored in the buffer to the input port switching device 220 based on a command from the concentration control device 230.

The flag generator 210 has a flag pattern generating function to deliver a predetermined flag pattern to the common data link channel 21 in the absence of any signal supplied to the individual link input ports 200, 201, ..., 20n.

The concentration control device 230 has a function to monitor signal input information from the individual link input ports 200, 201, ..., 20n, a function to select an input port based on address information which has been produced from the physical position of a port (link) to which an input signal is supplied, and output a switching command to the input port switching device 220 for a period of time commensurate with the length of the input signal, and a function to transmit input port (link) address information to the address identification channel 22 of the link highway 20 which is time-divided.

The input port switching device 220 has a function to connect the individual link input port 200, 201, ..., 20n or the flag generator 210 to the common data link channel 21 of the time-divided link highway 20 based on the switching command from the concentration control device 230.

Figure 3:
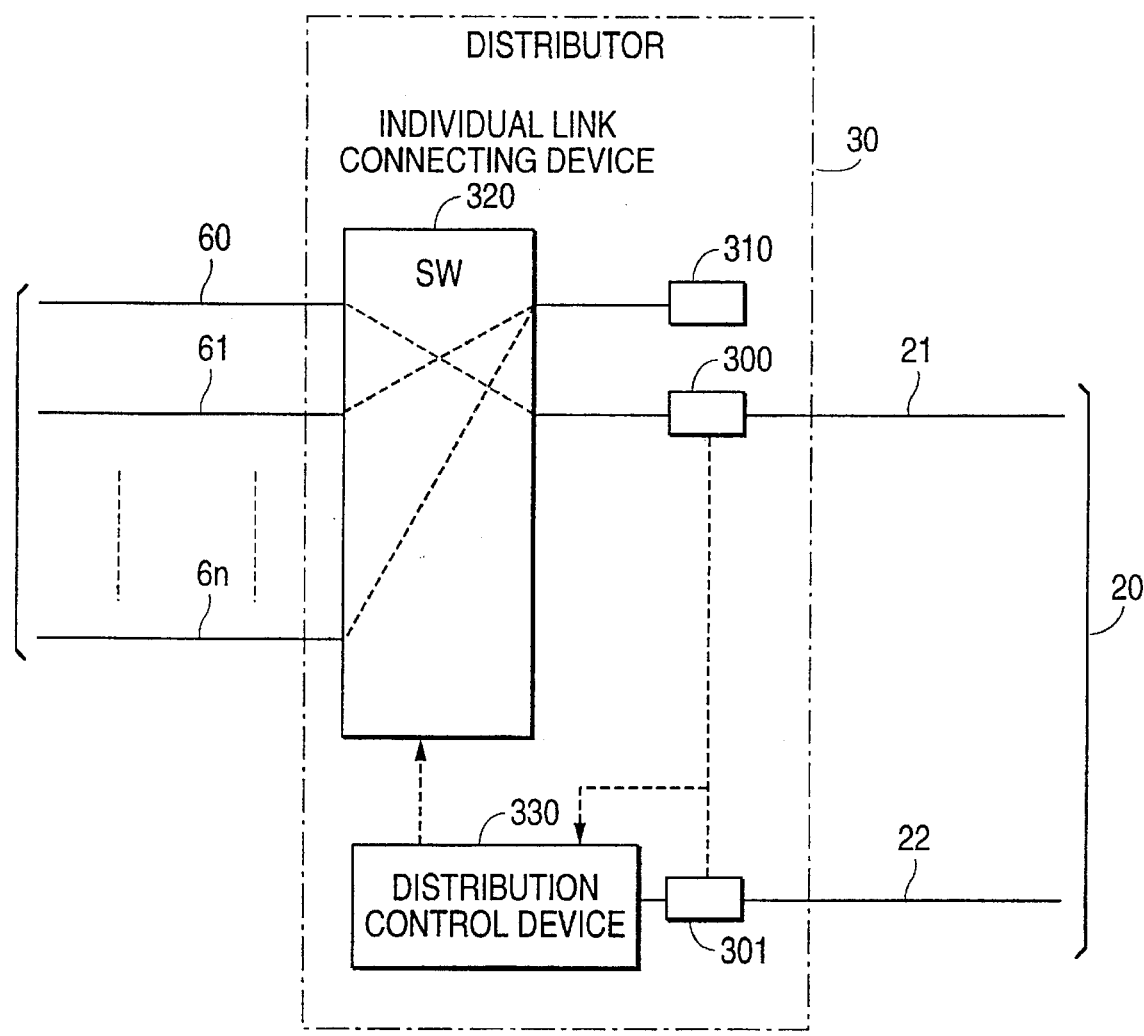
FIG. 3 is a block diagram of a distributor of the time-division multiplex communication system.

FIG. 3 shows a detailed arrangement of the distributor 30. Those parts shown in FIG. 3 which are identical to the parts shown in FIG. 1 are denoted by identical reference numerals.

The distributor 30 comprises a common data link channel input port 300, an address channel input port 301, a flag generator 310 as a flag generating means, an individual link connecting device 320 as an individual link connecting means, and a distribution control device 330 as a distribution control means.

The common data link channel input port 300 connects between the common data link channel 21 of the link highway 20 and the individual link connecting device 320. The address channel input port 301 connects between the address identification channel 22 of the link highway 20 and the distribution control device 330. The flag generator 310 is connected to the individual link connecting device 320. The distribution control device 330 is connected to the address channel input port 301 and the individual link connecting device 320. The individual link connecting device 320 is connected to the individual links 60, 61, ..., 6n.

The functions of the various devices of the distributor shown in FIG. 3 will be described below.

The common data link channel input port 300 has a buffer function to receive and temporarily hold signals transmitted from the common data link channel 21. The address channel input port 301 has a function to receive address identification information from the address identification channel 22, and indicate the received address identification information to the distribution control device 330. The distribution control device 330 has a function to output a command to the individual link connecting device 320 to supply an output signal from the common data link channel input port 300 to either one of the individual links 60, 61, ..., 6n and also to connect the remaining individual links to the flag generator 310, based on the signal input information from the common data link channel input port 300 and the address identification information from the address channel input port 301.

Figure 4:
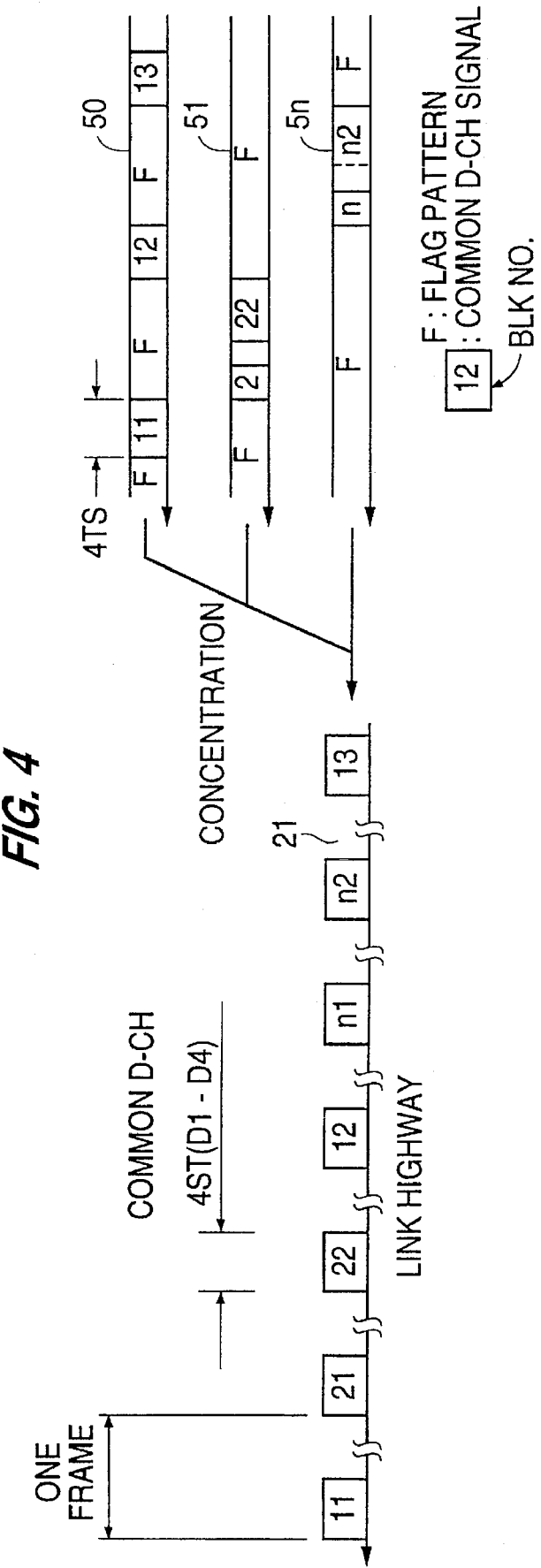
FIG. 4 is a diagram showing the principles of time-division multiplexing of the time-division multiplex communication system.

FIG. 4 shows, by way of example, the principles of time-division multiplexing of the time-division multiplex communication system. In the example shown in FIG. 4, four time slots per channel are assigned to the common data link channel 21 of the link highway 20.

The individual link 50 (link address A1), the individual link 51 (link address A2), ..., the individual link 5n (link address An) have respective independent data links over which control signals flow. These individual links 50, 51, ..., 5n are connected to the concentrator 10, which multiplexes four time slots per frame over the common data link channel 21 of the link highway 20.

While four time slots per frame are assigned to the common data link channel 21 of the link highway 20 in the illustrated embodiment, more or less time slots may be assigned to the common data link channel 21 according to the system specifications.

Figure 5:
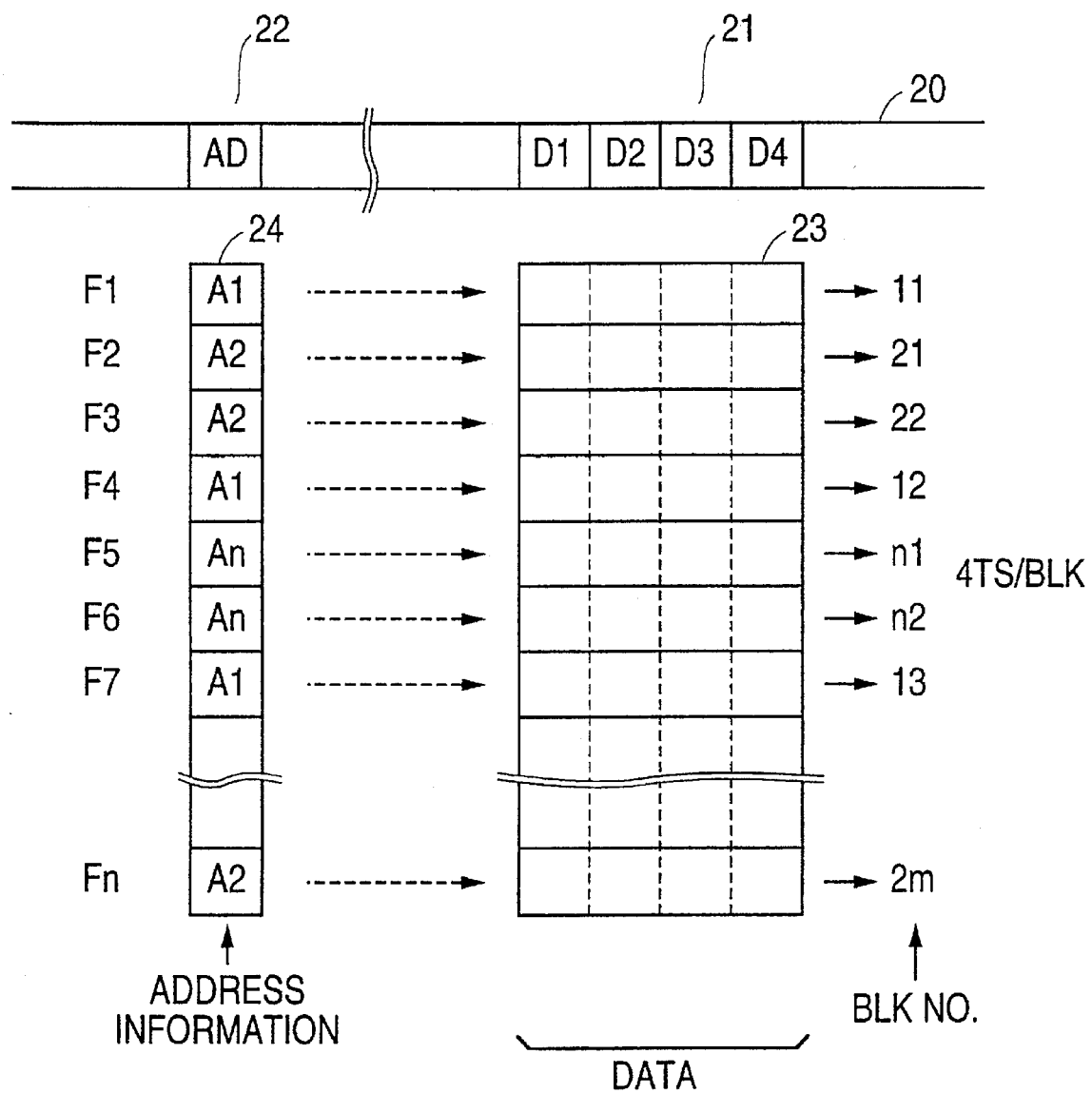
FIG. 5 is a diagram showing channels over a link highway of the time-division multiplex communication system.

FIG. 5 shows, by way of example, channels over the link highway 20 of the time-division multiplex communication system. As with the example shown in FIG. 4, four time slots per channel are assigned to the common data link channel 21 of the link highway 20 in the example shown in FIG. 5.

In the common data link channel 21, four time slots assigned per channel are grouped as a block which corresponds to each individual link. Numeric representations on the right-hand side of common data link channels 23 of respective frames correspond respectively to block numbers (BLK No.) shown in FIG. 4.

The address identification channel 22 is a channel for transmitting address identification information corresponding to the common data link channel 21. In this example, one time slot is assigned per channel to the address identification channel 22.

Address identification channels 24 of respective frames represent the address identification channels 22 of the respective frames. The address identification channels 24 of the respective frames correspond to the frames (blocks) of the common data link channels 23 of the respective frames. Alphanumeric representations in the address identification channels 24 of respective frames indicate address information of the individual links corresponding to the individual data link channels before they are connected to the concentrator 10.

Operation of the time-division multiplex communication system according to the present invention will be described below.

A signal transmitted from the individual link terminator 40 is delivered over the individual link 50 to the concentrator 10 where the signal is temporarily held by the individual link input port 200. The concentrator 230 periodically monitors the input ports, determines a link address from the individual link input port 200 to which the signal is supplied, selects the individual link input port 200 based on the address information, outputs a switching command to the input port switching device 220 for a period of time (in this example, four time slots make up one block) depending on the length of the input signal or a maximum delivery time (the number of blocks) determined by the time-division multiplex communication system, and connects the individual link input port 200 to the common data link channel 21 of the link highway 20, and transmits the signal from the individual link input port 200 to the common data link channel 21. In synchronism with the transmission of the signal, the concentration control device 230 transmits the address information of the individual link input port (link) 200 from which the signal is being transmitted, to the address identification channel 22 of the time-divided link highway 20. As shown in FIG. 5, the link addresses (destinations) of the signals in the common data link channels 21 of the respective frames are indicated by the address identification channels 22 of the respective frames.

The address identification channel 22 allows a signal destination to be specified without modifying or adding signals in the individual links.

As described above, the concentration control device 230 successively monitors the individual link input ports 200 -

20n, and successively delivers signals and address information of the respective individual links to the common data link channel 21 and the address identification channel 22.

If there is no input signal supplied to the individual link input ports 200 - 20n as determined as a result of the monitoring process, the concentration control device 230 outputs a command to the input port switching device 220 to connect the flag generator 210 to the common data link channel 21. In the absence of any input signal, therefore, a given flag pattern is transmitted from the flag generator 210 to the common data link channel 21.

The data transmitted over the common data link channel 21 and the address information transmitted over the address identification channel 22 are received respectively by the common data link channel input port 300 and the address channel input port 301 in the distributor 30. When the data and the address information are detected respectively by the common data link channel input port 300 and the address channel input port 301, the distribution control device 330 outputs a command to the individual link connecting device 320 to supply an output signal from the common data link channel input port 300 to a desired individual link (in this example, the individual link 60) based on the address identification information received by the address channel input port 301. The distribution control device 330 also outputs a command to the individual link connecting device 320 to connect the other unaddressed individual links (in this example, the individual links 61 - 6n) to the flag generator 310. Based on the command from the distribution control device 330, the individual link connecting device 320 changes the circuit connections.

The signal on the common data link channel 21 is now transmitted over the individual link 60 to the individual link terminator 70, and a flag pattern from the flag generator 310 is transmitted through the individual links 61 - 6n to the respective individual link terminators 71 - 7n.

While a certain preferred embodiment of the present invention has been shown and described in detail, such description is for illustrative purposes only, and it is to be understood that various changes and variations may be made without departing from the spirit or scope of the following claims.

What is claimed is:

1. A time-division multiplex communication system for transmitting data from a plurality of transmitting individual links connected to respective individual link terminators to a plurality of receiving individual links connected to respective individual link terminators, comprising:

a link highway having a common data link channel and an address identification channel;

a concentrator comprising:

a plurality of input ports for receiving and temporarily holding input signals transmitted from said transmitting individual links through said respective individual link terminators;

address detecting means for detecting reception of the input signals by said input ports and detecting input port addresses of the input signals from physical positions of said input ports;

input port switching means for connecting an indicated input port to said common data link channel for a first indicated period of time;

concentration control means for controlling said input port switching means to connect one of said input ports which is indicated by the input port address of an input signal to said common data link channel of the link highway for a period of time depending on a length of said input signal; and address information transmitting means for transmitting the input port address to said address identification channel of the link highway; and a distributor comprising:

a common data link channel input port for receiving a signal from said common data link channel;

an address channel input port for receiving address information from said address identification channel;

individual link connecting means for connecting said common data link channel input port to an indicated one of said receiving individual links for a second indicated period of time; and distribution control means for controlling selection of one of said receiving individual links to be connected to said common data link channel input port and said second indicated period of time based on said address information received by said address channel input port.

2. A time-division multiplex communication system according to claim 1, wherein said concentrator further comprises flag generating means connected to said input port switching means, for transmitting a predetermined flag pattern to said common data link channel when any of said input ports is receiving no input signal.

3. A time-division multiplex communication system according to claim 2, wherein said distributor further comprises flag generating means connected to said individual link connecting means, for transmitting a predetermined flag pattern to those receiving individual links which correspond to address information other than the address information received by said address channel input port.

4. A time-division multiplex communication system according to claim 1, wherein said distributor further comprises flag generating means connected to said individual link connecting means, for transmitting a predetermined flag pattern to those receiving individual links which correspond to address information other than the address information received by said address channel input port.

* * * * *